(No Model.) 2 Sheets—Sheet 1.

W. W. KELCHNER, A. M. O'DANIEL & P. H. PURSEL.
HORSE HAY RAKE.

No. 370,263. Patented Sept. 20, 1887.

Witnesses:
F. H. Schott
Fred E. Tasker

Inventor
William W. Kelchner
Addison M. O'Daniel
Peter H. Pursel
By their Attorney
John C. Tasker (No Model.) 2 Sheets—Sheet 2.
W. W. KELCHNER, A. M. O'DANIEL & P. H. PURSEL.
HORSE HAY RAKE.
No. 370,263. Patented Sept. 20, 1887.
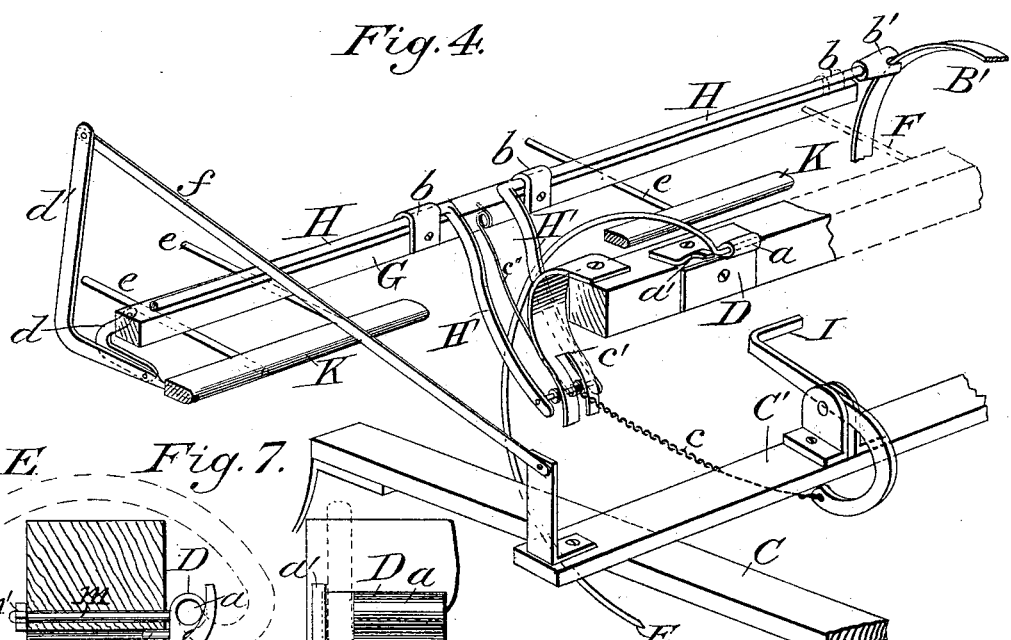
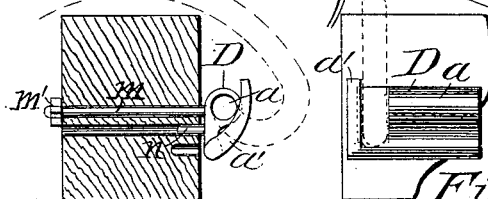
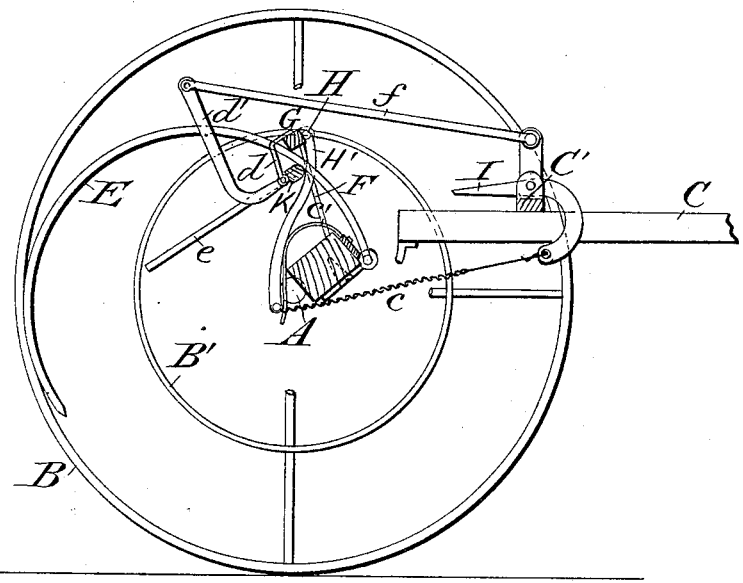
Witnesses
F. H. Schott
Fred E. Tasker
Inventor
William W. Kelchner,
Addison M. O'Daniel,
Peter H. Pursel
By their Attorney John C. Tasker

UNITED STATES PATENT OFFICE.

WILLIAM W. KELCHNER, ADDISON M. O'DANIEL, AND PETER H. PURSEL, OF ITHACA, NEW YORK; SAID KELCHNER AND O'DANIEL ASSIGNORS TO SAID PURSEL.

HORSE HAY-RAKE.

SPECIFICATION forming part of Letters Patent No. 370,263, dated September 20, 1887.

Application filed September 15, 1886. Serial No. 213,596. (No model.)

*To all whom it may concern:*

Be it known that we, WILLIAM W. KELCHNER, ADDISON M. O'DANIEL, and PETER H. PURSEL, citizens of the United States, residing at Ithaca, in the county of Tompkins and State of New York, have invented certain new and useful Improvements in and about a Horse Hay-Rake; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in horse hay-rakes, much difficulty having been experienced in the use of these machines as heretofore constructed, from the clinging of the hay to the teeth of the rake when the latter were raised to deposit the hay, thus causing it to form a straggling windrow, and sometimes to carry a part of its contents on to the next windrow, in doing which the rake would become too full, so that it would pass over the ground without gathering up all the hay.

To obviate this objection and to improve the construction of the rake in minor details is therefore the object of the present invention, which consists, first, in adding to the rake a cleaner and tooth-raising bar arranged to clean the teeth as they are raised and cause a full deposit of the contents of the rake at any desired point.

Secondly, the invention consists in a releasing-spring attached to the axle and having its free end bearing against the arms of the dump-rods, so as to instantly release the grip of said dump-rods from the wheel-flanges when the pressure is taken off the foot-lever by which they are actuated.

Thirdly, it includes an improved device for securing the teeth to the axle, by which they are allowed perfect freedom of movement upon said axle; and the invention comprises other combinations and arrangements of parts, as will be hereinafter stated.

Figure 1:
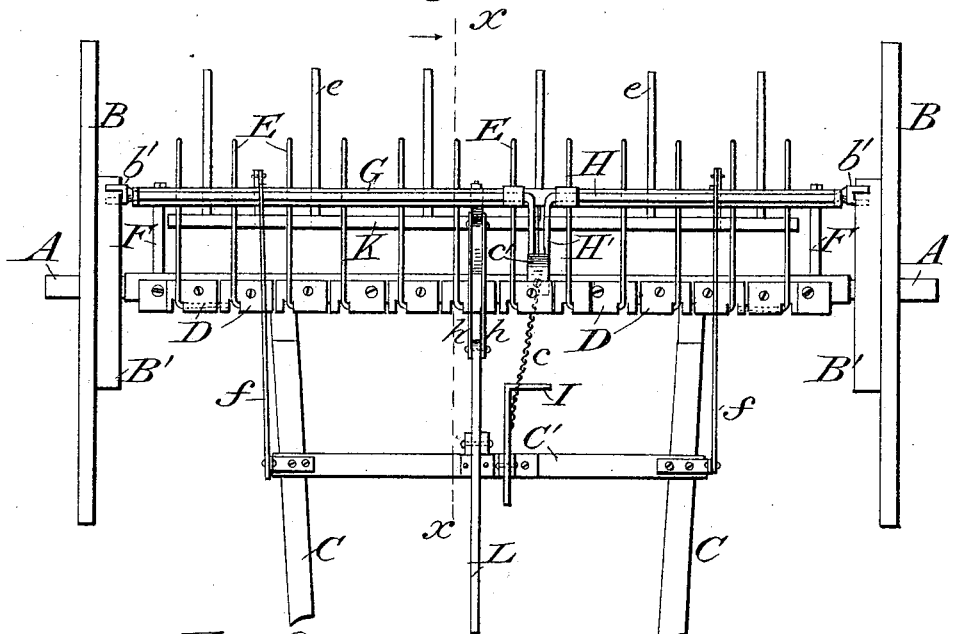
Figure 2:
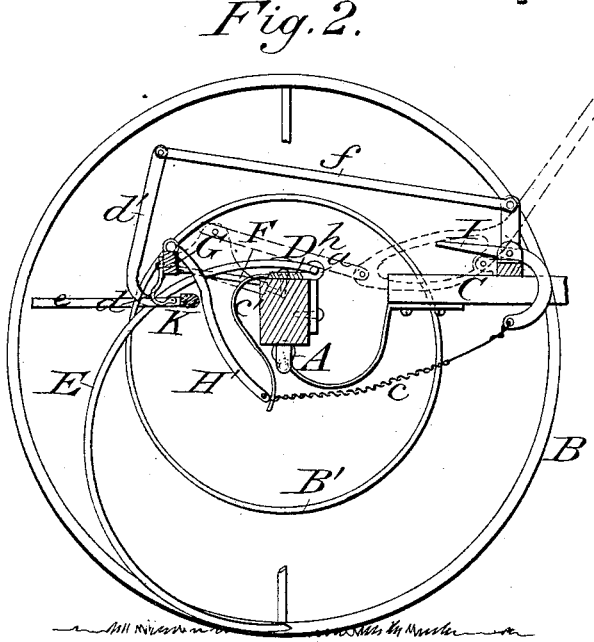
Figure 5:
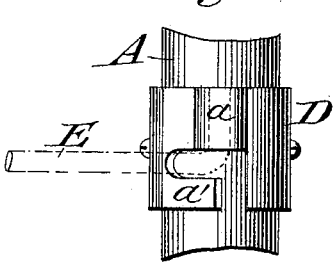
Figure 6:
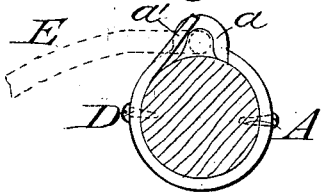

In the accompanying drawings, Figure 1 is a plan of the machine, showing the general arrangement of the different parts. Fig. 2 is a section on the line *x x* of Fig. 1, showing the parts in the position they occupy when the rake is at work. Fig. 3 is a similar sectional view with the teeth raised as in the act of depositing the contents of the rake. Fig. 4 is a perspective view showing the clearing device and its operating mechanism. Fig. 5 shows a plan view of a section of the axle with the improved tooth-attaching device in place upon it. Fig. 6 is a vertical section of a round axle, illustrating the manner in which the tooth-attaching devices or clamps are placed upon it. Fig. 7 represents a detail section and plan of a modified form of tooth-clamp.

Like letters designate like parts.

The general construction of this rake, except in the points heretofore stated, is similar to that of other rakes of this class now in use. A represents the axle, which may be round or square and of metal or wood, and B B the wheels, each of which is provided on its inner side with a projecting flange, B', by which the rake-teeth may be raised through the instrumentality of mechanism to be hereinafter described. C C designate the shafts, between which the horse is placed, said shafts being hinged to the axle, so as to allow the latter to make a partial rotation when desired. A cross-bar, C', connects the shafts C and forms a support for the operating-levers, as well as for the driver's seat, which latter is so placed that said levers shall be in a convenient position for the driver's manipulation.

Attached to the axle at suitable distances from each other are the clamps D, by means of which the teeth are connected with said axle. These clamps are preferably made of wrought-iron, with an eye, *a*, through which the end of a tooth, E, bent at right angles or having a T-head, passes, a projecting lip, *a'*, being formed upon the clamp, which, when the tooth is in place, prevents its withdrawal from the eye *a*.

The clamp may be secured upon the axle as shown in Fig. 2; but when a round axle is used we prefer to make the clamp as shown in Figs.

5 and 6—that is, as a band encircling the axle and provided with the same eye for receiving the tooth and projecting tongue to prevent its displacement, Carried upon the standards F F, which project from the axle, is the rider-bar G. This bar is provided with journal-bearings b b, in which are placed the cranked dump-rods H H. These rods are enlarged and slotted at their outer ends, b', the slot embracing loosely the flanges B' upon the wheels, while their inner cranked ends are connected by the chain or rod c to the lower end of the foot-lever I, pivoted upon cross-bar C'. It will be seen that by this construction pressure upon the foot-lever will cause the dump-rods to bite the flanges upon the wheels, and when the rake is moving forward raise the rider-bar G, thus imparting a partial rotation to the axle, which movement of the axle will, through its connections, raise the teeth to the height necessary to enable them to pass over a windrow or other obstruction; but when the pressure upon the foot-lever is removed they will go back to the proper position for work through the agency of the spring c', which is attached to the axle and acts against the arms H' of the dump-rods, causing said rods to release their grip upon the wheel-flanges.

The action of the spring c' may, if desired, be supplemented by a spring, c'', which is attached to the rider-bar G, and also to the connection between the ends of arms H' H'. (See Fig. 4.)

It will be apparent that were it not for the clinging of the hay to the teeth a rake constructed as hereinbefore described would be all that was necessary to make a perfectly-operating machine; but the fact demonstrated by practice that the hay under certain conditions will not wholly free itself from the teeth renders it absolutely imperative that the machine shall be provided with means for clearing the teeth and forcing the hay downward when the teeth are raised.

This result we attain by placing beneath the rider-bar G, and attached thereto by the arms d d, to the lower ends of which it is pivoted, a clearer-bar, K. This clearer-bar lies normally just below the teeth of the rake and is provided with a series of rearwardly-projecting clearer-sticks, e e, which project between the teeth and are caused to move downward when the teeth of the rake are raised by means of the arms d' d', which are firmly secured to the clearer-bar at their lower ends and pivoted at their upper ends to the rear ends of the rods f f, the forward ends of which rods are secured to the cross-piece C'. It will be seen that by means of these connections the clearer-bar will have a turning movement, and as the rake-teeth are raised the clearer-sticks will move downward, thus forcing out the contents of the rake; and a further advantage results from the assistance of the clearer-bar in raising the rake-teeth as it comes in contact with them whenever the axle is rotated at a point in their length where its action is most effective and least likely to produce injury to a tooth should its point be caught in any obstruction.

Pivoted upon the cross-bar C' is a hand-lever, L, that projects upward within easy reach of the driver, and through its connections h h with the rider-bar enables the driver to raise the rake when desired without the intervention of the dump-rods and wheel-flanges.

In Fig. 7 is shown a modification in the construction of the tooth-attaching device or clamp, whereby the same is more firmly and conveniently secured to the axle. The axle in this case is provided with three or more parallel holes, as shown in Fig. 7, and the clamp itself is provided with a bolt, m, sufficiently long to pass through one of the holes in the axle and be secured by a nut, m', with which its extremity is provided for the purpose, and it also has a short pin or stud, n, which is adapted to enter the next hole. In this manner the clamp can be tightly and rigidly attached to the axle, and the provision of three or more holes enables it to be adjusted as desired, for the bolt m and stud n may be inserted into any two adjacent holes, and thus the tooth-clamp may be located nearer to or farther away from either edge of the axle.

Having thus described our invention, what we claim as new, and desire to secure by Letters Patent, is—

1. The combination, with the axle, the rider-bar, and the dump-rods, of the clearer-bar K, having clearer-teeth e e and connected with the rider-bar by arms d d, the arms d' d', firmly secured to the clearer-bar and pivoted to arms d d, and the rods f f, pivoted to the upper ends of arms d' d' and connected to the draft-frame, substantially as described.

2. The combination of the axle A, wheels B B, having circular flanges B', the rider-bar G, carried by standards on the axle, the cranked dump-rods H, having slotted outer ends, b' b', the spring c', secured to the axle, the clearer-bar K, having clearer-teeth e e, the arms d d, arms d' d', and rods f f, all arranged substantially as shown and described.

3. As an improvement in hay-rakes, the combination, with the axle, of a tooth-clamp, D, provided with eye a and projection a', for keeping the tooth in place, and having also bolt m and stud n, said bolt and stud entering adjacent holes in the axle, substantially as shown and described.

In testimony whereof we affix our signatures in presence of two witnesses.

WILLIAM W. KELCHNER.
ADDISON M. O'DANIEL.
PETER H. PURSEL.

Witnesses:
RAYMOND L. SMITH,
M. N. TOMPKINS.